US005477024A

United States Patent [19]

Share et al.

[11] Patent Number: 5,477,024

[45] Date of Patent: Dec. 19, 1995

[54] BACK-LIT BUTTON ASSEMBLY

[75] Inventors: Lawrence Share, Skokie; Donald L. Van Erden, Wildwood; James E. Hoadley, Palantine, all of Ill.

[73] Assignee: Illinois Tool Works Inc., Glenview, Ill.

[21] Appl. No.: 282,446

[22] Filed: Jul. 29, 1994

Related U.S. Application Data

[62] Division of Ser. No. 52,511, Apr. 29, 1993, Pat. No. 5,376, 314.

[51] Int. Cl.[6] .......... B23K 26/00; B29C 45/14

[52] U.S. Cl. .......... 219/121.69; 219/121.85; 264/132; 264/400

[58] Field of Search .......... 219/121.69, 121.68, 219/121.85; 264/25, 510, 513, 132, 522, 259

[56] References Cited

U.S. PATENT DOCUMENTS

| | | | |
|---|---|---|---|
| 3,919,559 | 11/1975 | Stevens | 250/508 |
| 3,922,440 | 11/1975 | Wegwerth et al. | 428/437 |
| 4,764,410 | 8/1988 | Grzywinski | 428/120 |
| 4,766,023 | 8/1988 | Lu | 420/120 |
| 4,851,061 | 7/1989 | Sorkoram | 156/63 |
| 5,005,949 | 4/1991 | Egawa et al. | 350/276 R |
| 5,098,633 | 3/1992 | Hausler | 264/511 |
| 5,142,415 | 8/1992 | Koehnle | 359/601 |
| 5,147,716 | 9/1992 | Bellus | 428/323 |

*Primary Examiner*—Mark H. Paschall
*Attorney, Agent, or Firm*—Schwartz & Weinrieb

[57] ABSTRACT

A method of providing a clear image on a component including the steps of providing a transparent member having first and second opposite sides, providing a layer of opaque material on the second side of the transparent member and ablating away a predetermined pattern of the opaque layer by directing a laser beam at portions of the first side of the transparent member corresponding to the predetermined pattern, the laser beam passing through the transparent member to contact and ablate the opaque layer and provide a clear image through the transparent member corresponding to the predetermined pattern.

20 Claims, 4 Drawing Sheets

Fig. 1
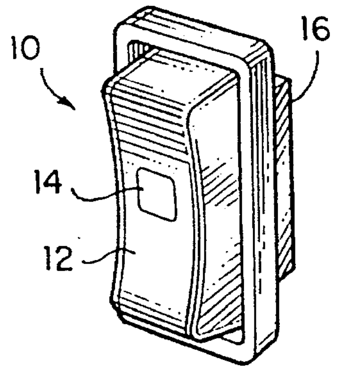
Fig. 2
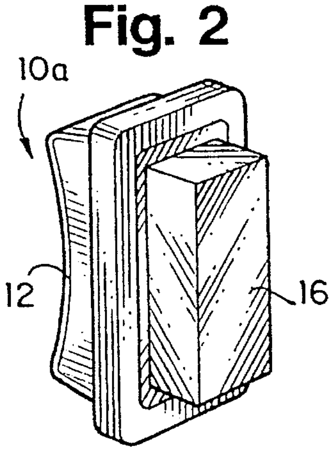
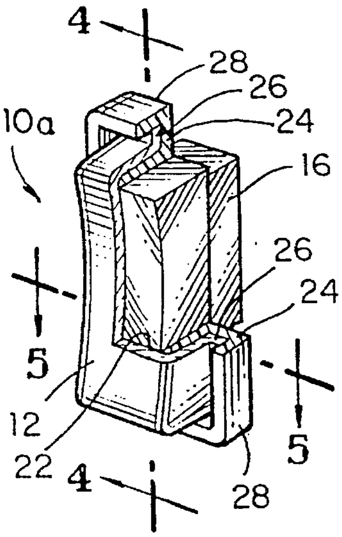
Fig. 3
Fig. 4
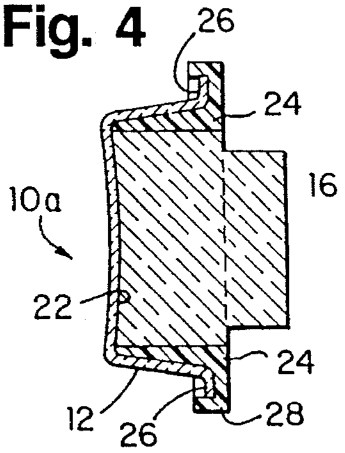
Fig. 5
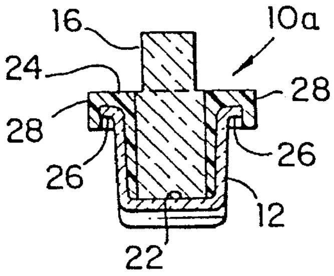
Fig. 6
PRIOR ART
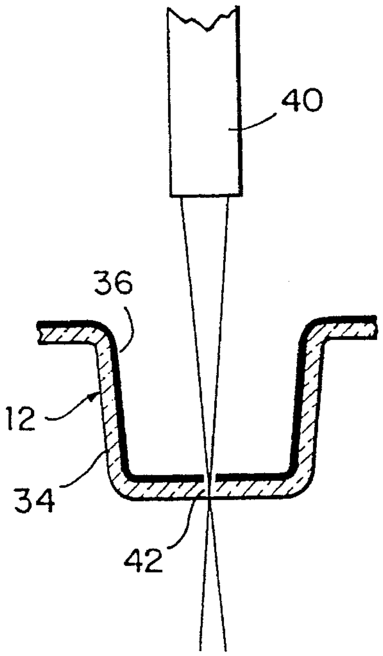
Fig. 7
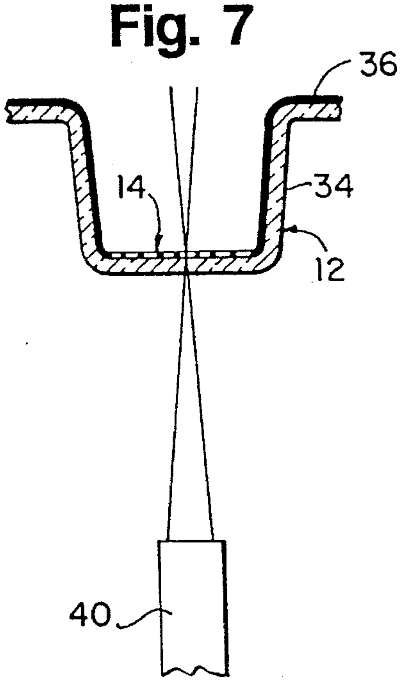

Fig. 15
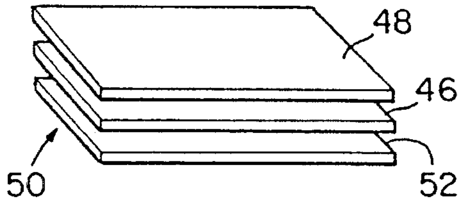
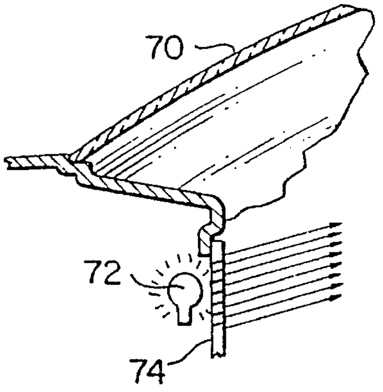
Fig. 16
PRIOR ART
Fig. 17
PRIOR ART
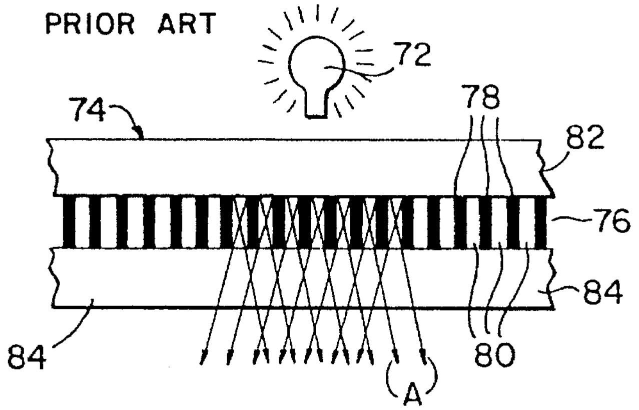
Fig. 18
PRIOR ART
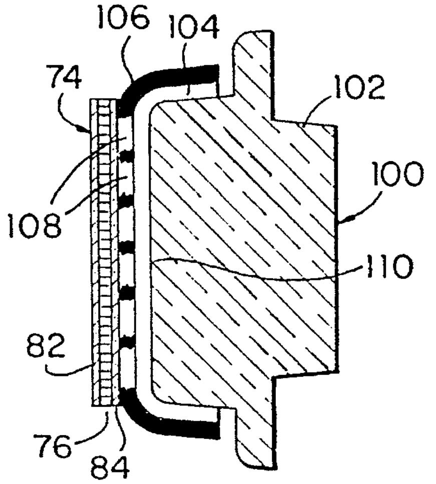
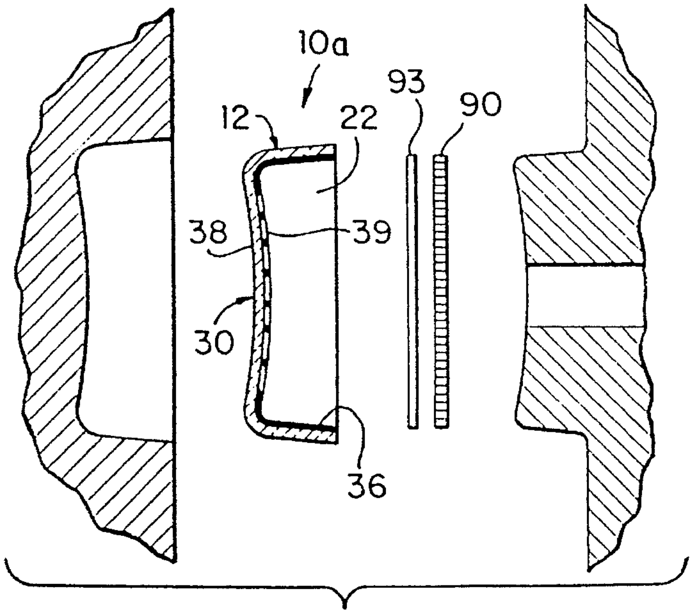
Fig. 19
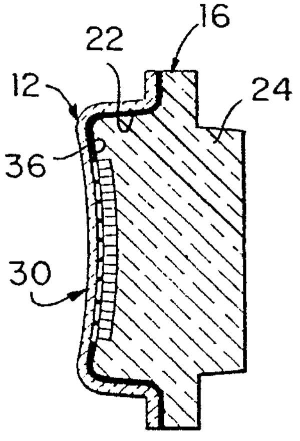
Fig. 20

BACK-LIT BUTTON ASSEMBLY

This application is a division, of application Ser. No. 08/052,511, filed Apr. 29, 1993.

BACKGROUND OF THE INVENTION

1. Field of the Invention

The present invention relates generally to back-lit buttons, and more particularly to a button assembly and method of making the same including an opaque formed cap of any simple or complex shape wherein the cap includes a graphic image formed therewith having a first color visible in daytime or direct light and one or more different colors when back-lit, and wherein further, the graphic image is not susceptible to wear or accumulation of residue during use and the assembly can direct light through the graphic image in a predetermined direction.

2. Description of the Related Art

Back-lit buttons are typically utilized on control panels and dashboards of automobiles and provide a graphic image on a substantially planar exterior face of the button which identifies the function of the button, such as a "door lock" button or the like. These buttons are usually formed from plastic and are provided with a dark major opaque color, such as black, and a clear window therethrough having a graphic image thereon of a contrasting color, such as white or gray, which is translucent and referred to as a "daytime color." When the graphic is back-lit with a light source of a different "nighttime color," such as green, blue, red or orange, the nighttime color radiates through the daytime color and the graphic image is seen by a user having the nighttime color.

An example of such a back-lit button is provided by what is known in the art as the "Paint and Laser Method" an example of which is illustrated in FIG. 18. As described in detail below, this method typically includes applying a white translucent layer of material, which provides the daytime color, over a color tinted translucent plastic button, which provides the nighttime color. An opaque black layer of material is then applied over the white layer and a laser is directed against the black layer so as to etch a desired graphic image through the black layer only, exposing the white layer underneath. Thus, the graphic image is provided in white for daytime viewing and, when the tinted plastic button is back-lit from an external light source, the color of the tinted plastic can be seen through the white translucent layer for nighttime viewing.

The graphic images on these buttons, however, are on the front exterior or "first surface" of the button which faces outward from the control panel and is repeatedly contacted by a user. Thus, they are readily susceptible to wear and image erosion as well as residue accumulation over and within the recesses forming the image which serve to render the image unreadable. Additionally, since the tinted plastic button provides the nighttime color, it is difficult to provide more than one nighttime color per button.

Back-lit buttons also are known which have a graphic image formed on an interior or "second surface" of the button and are provided by what is known as a "Formed Cap Process." An example of such a process is disclosed, for example, in U.S. Pat. No. 5,098,633 which is owned by the same assignee as the assignee herein.

In that patent, silk screening techniques are utilized to provide an opaque black layer having a clear graphic image area upon one side of a transparent flat sheet. A white or gray daytime color layer and one or more nighttime color layers are then applied over the clear graphic image area. Thereafter, the sheet is thermoformed into a cap of a desired shape and filled with transparent resin on the side of the sheet containing the graphic image and color layers. Alternatively, the cap is applied over and adhered with resin to a preformed transparent support structure so as provide a finished button. Thus, the graphic image, color layers and resin are on the "second surface" of the cap and the opposite "first surface" or exterior of the cap is contacted by a user so that the image is not susceptible to wear or residue accumulation.

Although this process is successful when the sheet is thermoformed into a cap having a relatively flat or slightly curved surface upon which the graphic image is provided, the graphic image can become distorted when the sheet is thermoformed into a cap having a graphic image display surface which is of a complex three-dimensional shape. In such a situation, it is difficult to control the distortion or stretching of the sheet during thermoforming. Although the distortion can be somewhat predicted and accounted for before thermoforming, it is difficult to precisely determine the distortion and provide the quality and consistency necessary for mass-production of such buttons.

Additionally, in automobiles, illumination from dashboard displays and back-lit buttons at night causes glare to be reflected off the windshield into the driver's eyes. This glare is typically reduced or eliminated by extending a ledge from the dashboard above the displays so as to block the light from reflecting off the windshield.

Another method is to utilize what is known in the art as a "light control film" or "LCF", illustrated in FIGS. 16–18, which directs the light emitted from a display or back-lit button in a desired direction away from the windshield. As described in detail below, the LCF includes a core formed by a plurality of alternating opaque louvers and transparent layers which are sandwiched between two layers of thin clear film. LCFs, however, are applied to the exterior "first surface" of the display or button on top of the graphic image which detracts from the daytime image of the graphic image and, due to the very thin layer of film over the louvers, the film can be readily scratched thereby distorting the effects of the LCF and exposing the core to scratching or wear. Additionally, for the LCF to work, the surface over which the LCF is applied must be substantially planar.

Accordingly, it is desirable to provide a button assembly and method of making the same including an opaque formed cap of any simple or complex shape wherein the cap includes a graphic image formed therewith having a first color visible in daytime or direct light and one or more different colors when back-lit, and wherein further, the graphic image is not susceptible to wear or accumulation of residue during use and the assembly can direct light through the graphic image in a predetermined direction.

SUMMARY OF THE INVENTION

A method of providing a clear image on a component is disclosed including the steps of providing a transparent member having first and second opposite sides, providing a layer of opaque material on the second side of the transparent member, and ablating away a predetermined pattern of the opaque layer by directing a laser beam at portions of the first side of the transparent member corresponding to the predetermined pattern, the laser beam passing through the transparent member to contact and ablate the opaque layer and provide a clear image through the transparent member corresponding to the predetermined pattern.

Before or after ablating, the component can be formed into a desired shape, one or more translucent color layers can be applied over the opaque material covering the clear image and a support member can be connected to the component on the side of the component containing the opaque and color layers. If desired, a light directing member also can be utilized to direct light through the clear image in a predetermined direction.

BRIEF DESCRIPTION OF THE DRAWINGS

Various other objects, features, and attendant advantages of the present invention will be more fully appreciated from the following detailed description, when considered in connection with the accompanying drawings, in which like reference characters designate like or corresponding parts throughout the several views, and wherein:

FIG. 1 is a front perspective view of the button assembly of the invention illustrating the assembled formed cap and button support member;

FIG. 2 is a rear perspective view of the button assembly of FIG. 1;

FIG. 3 is a front perspective view of the button assembly of the invention, similar to FIG. 1, with a portion of the cap broken away;

FIG. 4 is a longitudinal cross-sectional view of the button assembly taken along lines 4—4 of FIG. 3 and in the direction indicated by the arrows;

FIG. 5 is a lateral cross-sectional view of the button assembly taken along lines 5—5 of FIG. 3 and in the direction indicated by the arrows;

FIG. 6 is a lateral cross-sectional view of a cap illustrating prior art laser etching techniques which proved unsuccessful in the present invention;

FIG. 7 is a lateral cross-sectional view of a cap of the present invention illustrating successful laser ablating as taught by the present invention;

FIG. 15 is a perspective exploded view of a two-color foil member of the invention;

FIG. 16 is a sectional view of a portion of a dashboard and windshield of an automobile illustrating a light control film of the prior art applied over a light source;

FIG. 17 is a side view of a prior art light control film;

FIG. 18 is a longitudinal cross-sectional view of the prior art light control film of FIG. 17 applied across the front flat surface of a prior art back-lit button;

FIG. 19 is an exploded cross-sectional view of a formed cap, light control film and color film of the invention being inserted within a mold; and FIG. 20 is a longitudinal cross-sectional view of the molded cap and light control film of the invention without the color film.

DESCRIPTION OF THE PREFERRED EMBODIMENTS

Figure 8:
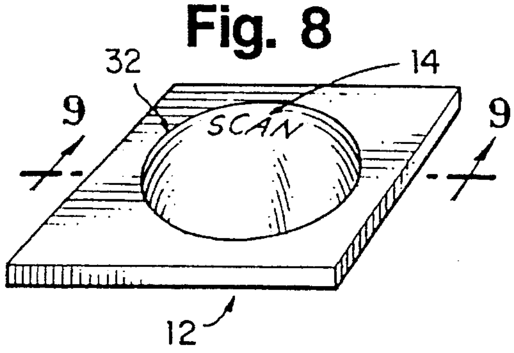
FIG. 8 is a perspective view of a formed cap of the present invention utilized to form a button having a complex three-dimensional shape and an intricate undistorted graphic image therewith.

Referring to FIG. 1, the button assembly of the invention is designated generally by the reference numeral 10. The assembly 10 substantially includes two pieces, an opaque cap 12 having a desired translucent graphic image or "window" 14 formed therewith as described below and a clear or tinted transparent button support member or "light pipe" 16 which is secured within the interior of the cap 12.

Although the assembly 10 is illustrated as a button, it is to be understood that the teachings of the present invention can be utilized to provide any type of display panel, insert or the like and without the support member 16. Additionally, the support member 16 can be any desired color, including translucent white which can then be back-lit by a tinted bulb to provide the desired daytime and nighttime characteristics described herein.

Two basic forms of the assembly 10 are illustrated, both of which provide a one-piece structure whose shape and assembly can vary. The first form of the assembly 10*a* is illustrated in FIGS. 1–5 and 12 where the button support member 16 is formed before assembly and is slightly smaller than the desired final shape of the cap 12.

Figure 12:
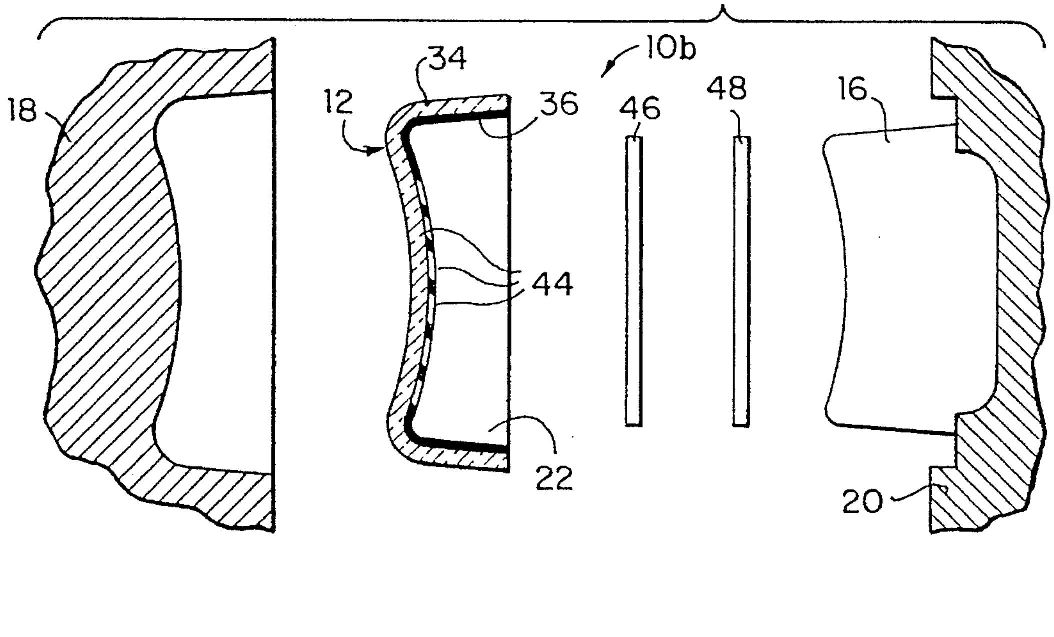
FIG. 12 is an exploded cross-sectional view, similar to FIG. 10, illustrating another type of molding utilized to provide the button assembly of FIGS. 1–5.

As FIG. 12 illustrates, the cap 12 and button support member 16 are inserted within respective female and male mold portions 18 and 20. As FIGS. 3–5 illustrate, the button support member 16 is secured to an interior space 22 of the cap 12 by injection molding a resin 24 in predetermined locations between the cap 12 and the button support member 16. To provide support to exterior edges 26 of the cap 12, the resin 24 can extend about the edges 26 to form shoulders 28, if desired.

Figure 10:
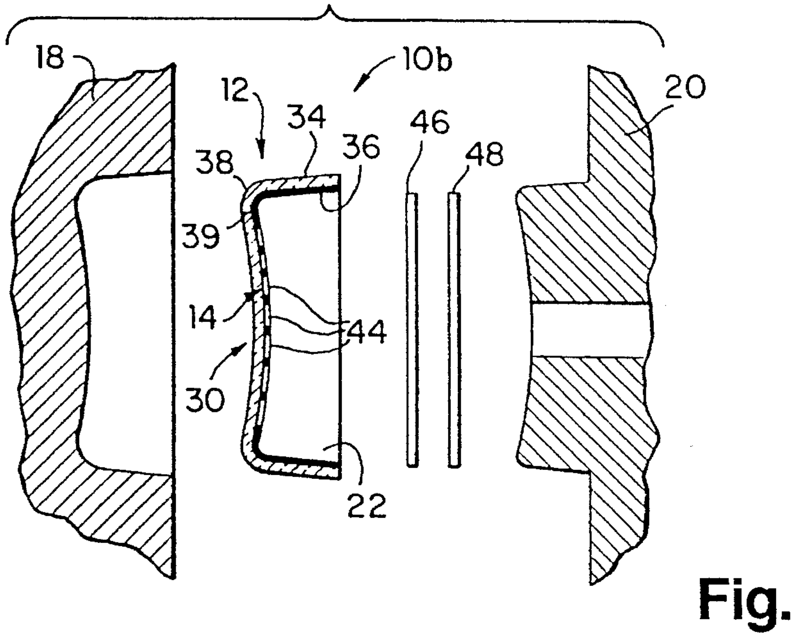
FIG. 10 is an exploded cross-sectional view of a formed cap of the invention being inserted within a mold with desired color foil layers.
Figure 11:
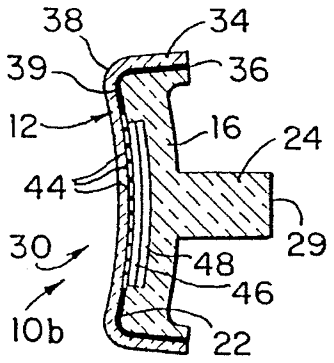
FIG. 11 is a longitudinal cross-sectional view of a button assembly formed by molding as illustrated in FIG. 10.

The second form of the assembly 10*b* is illustrated in FIGS. 10 and 11. For clarity, the invention will be described hereinafter with particular reference to assembly 10*b*. It is to be understood, however, that the following description similarly applies to assembly 10*a*.

The assembly 10*b* includes the cap 12 having the desired graphic image 14 therewith which is inserted within a female mold portion 18. The interior space 22 is then filled with resin 24 during injection molding so as to provide the support member 16 and the desired final shape of the assembly 10*b* illustrated in FIG. 11.

Typically, in use, the assembly 10*b* is mounted on an external surface of an automobile control panel (not illustrated). Upon being depressed by a user, an outwardly extending leg portion 29 of the support member 16 contacts a switch to provide a desired function.

Figure 9:
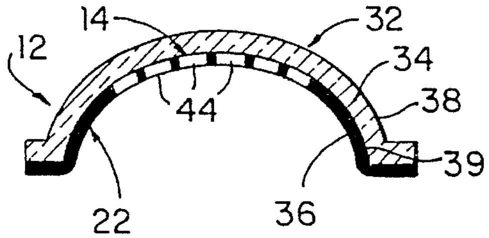
FIG. 9 is a cross-sectional view of the complex formed cap taken along line 9—9 of FIG. 8 and in the direction indicated by the arrows.

As FIGS. 10 and 11 illustrate, the cap 12 has a substantially rectangular configuration with a concave front surface 30. Alternatively, as FIGS. 8 and 9 illustrate, the cap 12 can have a complex three-dimensional front surface 32 of any desired shape. The present invention provides for such a variety of shapes of the cap 12 without any distortion of the graphic image 14 and is usable in mass-production to produce multiple caps 12 without compromising the quality of the graphic image 14.

As FIGS. 9–11 illustrate, the cap 12 includes a transparent member 34 approximately 15 mils thick with an opaque layer of suitable coating 36. The transparent member 34 includes a first exterior side 38 which will be contacted by a user and a second interior or "second side" 39, including the coating 36 thereon, which forms the interior surface or space 22 of the cap 12. Preferably, the coating 36 is a black ink between 1.5–2.0 mils thick having the thermal and mechanical properties necessary to withstand thermoforming and molding as described above in U.S. Pat. No. 5,098,633 without any pin holes or other distortions.

The coating 36 can be of any desired color, including white, so long as the desired contrasting graphic image 14 is provided. Additionally, the cap 12 and coating 36 can be formed to provide a "dead front" type of graphic image 14 which is only substantially visible when back-lit.

As FIG. 7 illustrates, the graphic image 14, which can be of any desired shape or configuration, is removed or "ablated" from the transparent member 34 by a laser 40 after first passing through the transparent member 34. Details of the laser 40 are provided below.

It is important to note that initially, as FIG. 6 illustrates, the graphic 14 was attempted to be formed by etching the black layer 36 from the transparent member 34 with a laser 40 directly in contact with the black layer 36 as is known in the art of laser etching. This proved completely unsuccessful since, rather than etching away a desired graphic on the black layer 36, the laser 40 simply drove portions 42 of the black layer 36 directly into the transparent member 34.

It is also to be noted that the decision to reverse the cap 12 and direct the laser 40 first against the transparent member 34 as illustrated in FIG. 7 was merely a matter of trial and error decided upon after the failed attempt to etch as described with regard to FIG. 6. Although the black layer 36 removed according to FIG. 7 is described as being ablated, no residue or smoke was observed.

Preferably, the laser 40 is a low heat, low power laser known as an "Excimer" laser which is tunable to different frequencies and utilizes ultra-violet light as opposed to a more commonly known high heat, high power infrared laser which tends to cause discoloration, burning, frosting and/or distortion. The excimer laser 40 uses a beam which is focused through a mask or stencil, illustrated in FIGS. 13 and 14, having any desired graphic image 14. Once the beam passes through the desired portion of the mask, it contacts the cap 12 and ablates the desired portion of the black layer 36 corresponding to the mask graphic image without causing any damage or discoloration of the transparent member 34.

The beam of the excimer laser 40 can be rather wide and typically pulses while it sweeps across the surface of the cap 12. To provide the complex four letter graphic image 14 of FIG. 8, approximately 20 pulses were utilized, but such can vary.

It is to be noted that most laser etching techniques typically trace the pattern of the desired graphic image with a narrow point beam, rather than a broader beam which pulses and sweeps as does the excimer laser 40, which adds to the time needed to form the desired image and contributes to heat developed in the etched member. Thus, use of the beam and pulsing of the excimer laser 40 decreases the time needed to form the image 14 and heat build-up within the cap 12.

Use of the excimer laser 40 thereby enables the transparent member 34 to be formed into the desired shape after the black layer 36 is applied but before any imaging or further processing. This eliminates any distortion associated with thermoforming the graphic image 14 as well as any thinning of the black layer 36 or other color layers described below. Furthermore, the laser 40 provides the graphic image 14 to exact dimensions and in a precise location on the cap 12 and is completely identically reproducible from part-to-part. This significantly increases the quality of the assembly 10 which in turn reduces costs associated with inspection and rejection of assemblies 10.

As FIGS. 9–11 illustrate, after ablating the cap 12 with the laser 40, the graphic image 14 is formed on the second side 39 of the transparent member 34. The graphic image 14 is substantially formed by transparent portions 44 which were ablated and form the desired four letter graphic image of FIG. 8. Thus, the graphic image 14 is provided on the interior surface 22 of the cap 12 on the second side 39 which is known as a "second surface graphic". Consequently, before the graphic 14 can be eroded from contact by a user or other article, the transparent member 34, which preferably is 15 mils (0.015") thick, must first be worn through which would be rare during normal use throughout the life of the assembly **10*b***.

As FIG. 10 illustrates, in order to provide color to the graphic image 14, at least a first "daytime" translucent color layer 46 is applied across the transparent portion 44 formed on the interior 22 of the cap 12. Preferably, the first color layer 46 is selected to provide contrast to the black or other color layer 36 which forms the major color of the cap 12 and is visible during daylight or when a light is directed across the cap 12. Typical colors for the first color layer 46 include, but are not limited to, white and light gray as well as metallic colors such as gold, silver and the like.

Additionally, at least one second nighttime translucent color layer 48 is applied over the first color layer 46 and the transparent portion 44 formed on the interior 22 of the cap 12. Preferably, the second nighttime color layer 48 is blue, green, red or orange and does not change the color of the first layer 46 until the cap 12 is back-lit, thereby providing the nighttime color through the first color layer 46.

The second nighttime color can also be provided by a tinted translucent support member 16 or other insert which, when back-lit with a light source, conveys its color through the first color layer 46 to provide the nighttime color. It is also possible to provide the second nighttime color by using a clear support member 16 and a tinted bulb which conveys its color through the support member 16 and the first color layer 46 when illuminated. Alternatively, the first daytime color can be provided by a white translucent support member 16 or other insert which can be back-lit by a tinted bulb to provide the second nighttime color.

The first color layer 46 can be stamped with a pad, sprayed or silk-screened across the transparent portion 44, either as a complete single layer or in a precise pattern, and allowed to dry. Thereafter, the second color layer 48 can be similarly stamped with a pad, sprayed or silk-screened over the first layer 46 in a similar manner.

The first color layer 46 must be uniform in color and appearance, bright during daylight or when exposed to direct lighting from the first exterior side 38 of the cap 12 and translucent to enable the second color layer 48 to pass therethrough when back-lit. The second color layer 48 must similarly provide a bright, uniform color through the first color layer 46 when back-lit. Neither color layer 46 nor 48 should have pin-holes or other imperfections in daytime or when back-lit.

Preferably, the first and second color layers 46 and 48 are provided by what are known as "Transparent Second Surface Foils" (TSS foils), also known as transfer foils. TSS foils are typically utilized in hot stamp decorating or heat transfer decorating of desired objects, such as book bindings and the like. No drying is necessary when using TSS foils.

The TSS foils are composed of a 0.5 mil thick mylar polyester member coated on one surface with the desired color and include an adhesive end a release agent. The color is preferably provided by an ink or an extremely thin metallic layer, but can vary. If a metallic layer is utilized, aluminium is preferred due to its low cost, but silver, gold, copper, titanium, chromium, nickel and stainless steel can also be utilized. It is to be understood, however, that the particular material and thickness of the color layer can vary so long as it functions as described herein.

The TSS foils are thermally stable to withstand the temperatures of molding and/or thermoforming and provide a bright yet translucent and uniform color across the transparent portion 44. The adhesive and release agent can be omitted when TSS foils are utilized in the present invention. Alternatively, if desired, the color foil can be heat transferred to the transparent portion 44 and the mylar layer removed.

As FIG. 10 illustrates, the color layers 46 and 48 can be provided by separate foils within the mold and then molded to the cap 12 into the shape illustrated in FIG. 11. Alternatively, as FIG. 15 illustrates, to provide ease of assembly, one foil 50 can be provided comprising a mylar member 52 and the two color layers 46 and 48 applied thereto.

It is to be noted that unlike prior art devices, in the present invention more than the two color layers 46 and 48 can be readily utilized to provide more than one back-lit color 48. Thus, for example, the back-lit color of the "scan" graphic image 14 of FIG. 8 can be provided with a white daytime color while each letter in the word "scan" can be of a different nighttime color. This is provided in the present invention by merely pad stamping, silk-screening or using a different color TSS foil over a desired letter. Multiple colors cannot be provided in the prior art devices mainly because back lighting is provided by the tinted light pipe 16 which can only provide one nighttime color.

Figure 13:
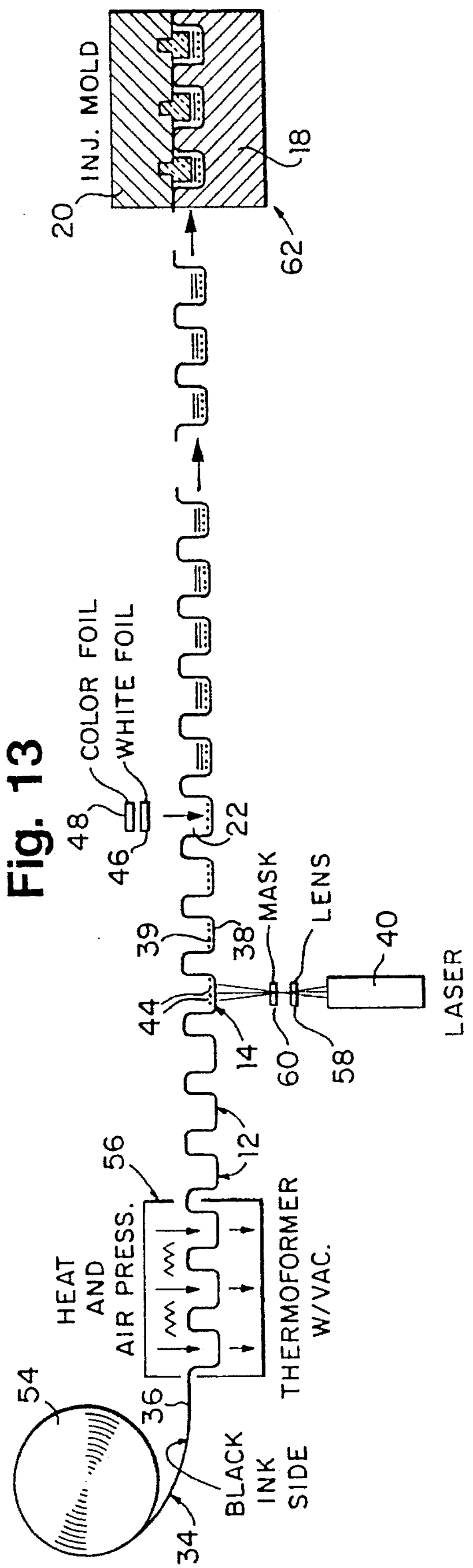
FIG. 13 is a schematic diagram illustrating one method of forming the button assembly of the invention.

FIGS. 13 illustrates the preferred steps necessary to form the cap 12 using the TSS foils for mass-production. The transparent member 34 having the black layer 36 can be supplied in a roll 54 and inserted directly into a thermoformer 56 which forms the transparent member 34 and black layer 36 into a desired shape of the cap 12. After leaving the thermoformer 56, the laser 40, positioned on the first side 38 of the transparent member 34 opposite the black layer 36, is focused through a lens 58 and a mask 60 to ablate the desired graphic image 14 onto each cap 12 by removing portions of the black layer 36, leaving transparent portions 44 on the cap 12 which form the graphic image or display 14.

Next, the white foil 46 and color foil 48 are inserted into the interior space 22 of the cap 12 so as to cover the transparent portion 44. Alternatively, a single foil 52, illustrated in FIG. 15, can be inserted into the interior space 22 of the cap 12 (not illustrated). The caps 12 then are conveyed into a molding machine 62 comprising the male and female mold portions 18 and 20 and the transparent resin 24 is injected into the interior space 22 of the cap 12 so as to form the desired button assembly 10*b*.

Figure 14:
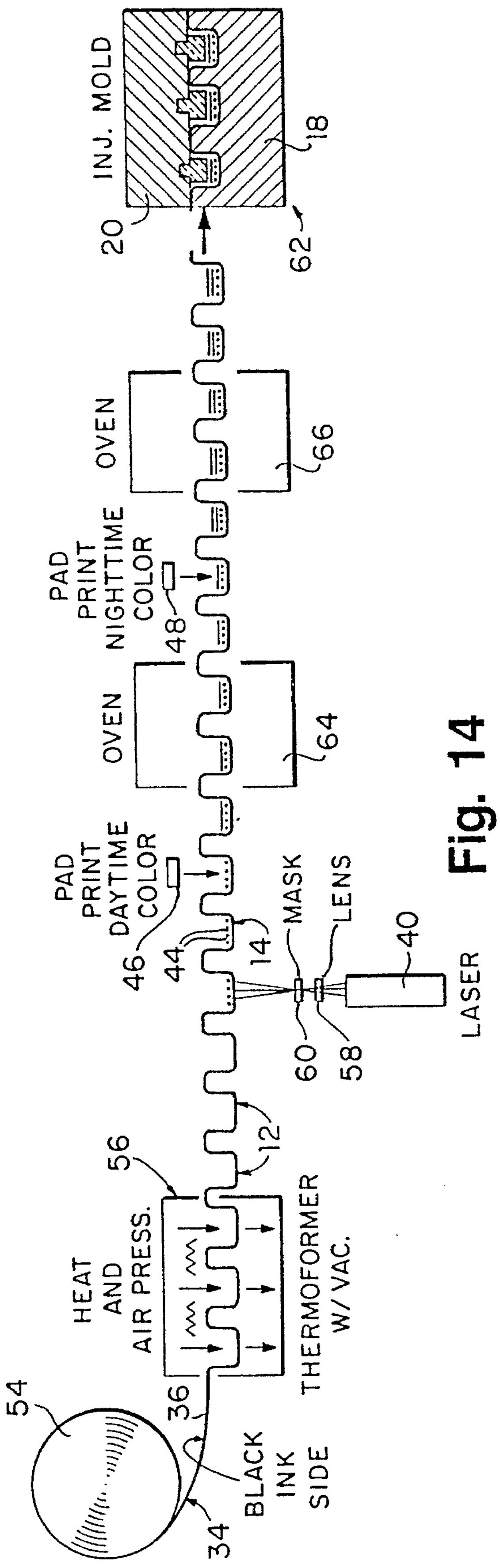
FIG. 14 is a schematic diagram illustrating another method of forming the button assembly of the invention.

FIG. 14 is similar to FIG. 13 up through the step of forming the graphic image or display 14 with the laser 40. Thereafter, the first color layer 46 is silk-screened, pad printed or otherwise applied across the transparent portion 44 on the interior surface 22 of the cap 12 and allowed to dry in a first oven 64. Upon leaving the first oven 64, the second color layer 48 is silk-screened, pad printed or otherwise applied across the first color layer 46 and allowed to dry in a second oven 66. After exiting the second oven 66, the caps 12 are conveyed to a molding machine 62 and the transparent resin 24 is applied as described above.

It is to be noted that to form the assembly 10*a* of FIGS. 1–5, the same process as described in either FIGS. 13 or 14 is applied up to the point of the cap 12 entering the male and female molds 18 and 20. As FIG. illustrates, at that point the pre-formed button support member or "light Pipe" 16 is inserted into the molding machine 62 and the resin 24 injected in predetermined areas to provide the finished assembly 10*a*.

In view of the above teachings, a number of variations of the button assembly 10 are possible. For example, the steps of forming and ablating can be reversed. Thus, a sheet 34 with a black layer 36 can first be ablated by the laser 40 so as to define the graphic image or display 14. Thereafter, the sheet 34 and graphic 14 can be formed into a cap 12, the color layers 46 and 48 are inserted by one or more TSS foils or otherwise and the cap 12 is molded as described above.

In this situation, however, since forming takes place after image ablating, the shape of the cap 12 is limited to flat or a slightly curved front surface 30 as illustrated in FIG. 10. Complex surfaces 32 as illustrated in FIG. 9 are possible, but the distortion of the image must be accounted for before forming which can be difficult to reproduce. It is conceivable, of course, that a completely automated, controlled system could accomplish forming complex shapes after ablating.

Similarly, after ablating a graphic image 14 on a flat sheet 34 the color layers 46 and 48 can be hot stamped over the transparent portions 44. The sheet 34 thereafter would be formed and molded as described above.

Finally, the flat sheet 34 can have the graphic 14 image formed thereon by silk-screening, rather than laser ablating. Thereafter the sheet 34 would be formed into the cap 12 and one or more TSS foils applied to the interior surface 22 of the cap 12 and molded. It is to be understood that the methods of providing the button assembly 10 are not limited to those described above.

FIGS. 16–18 illustrate a prior art light directing feature which is sometimes desirable for back-lit buttons. Briefly, a problem with illuminated dashboards and other control panels in automobiles is that light from these members contacts a windshield 70 causing reflective glare to be directed into a driver's eyes thereby impairing vision.

In order to direct the light from a light source 72 away from the windshield 70, a commercially available prior art light-control film (LCF) 74, such as that manufactured by the 3M Company, can be inserted in front of the light 72. As FIG. 17 illustrates, the LCF 74 is formed with a central core 76 including a plurality of opaque layers or louvers 78 interspersed with clear layers or sections 80. The core 76 is then sandwiched between two clear protective films 82 and 84 and provides the light pattern substantially illustrated by arrows "A". The films 82 and 84 are utilized to enhance light transmission such as by taking out the roughness or ridges provided by the alternating layers of the core 76.

FIG. 18 illustrates an LCF 74 utilized with a prior art back-lit button 100 which is formed by the prior art "paint and laser method" described above. To provide the button 100, a translucent color tinted button support member or light pipe 102 of a predetermined color and configuration is first coated with a translucent daytime color 104, such as white, and allowed to dry. Thereafter, a black opaque layer 106 is coated over the white layer 104, is allowed to dry, and a laser (not illustrated) is directed against the black layer 106 so as to etch away a desired pattern 108 to expose portions of the white layer 104 through the black layer 106. The LCF 74 is then secured over the black layer 106, such as with an adhesive or other means.

In order to provide the desired light directing characteristics, however, the button 100 must provide a substantially flat surface 110 over which the pattern 108 and LCF 74 are provided. Thus, the LCF 74 cannot be utilized with non-planar surfaces, such as surface 30 illustrated in FIGS. 10, 11, 19 and 20, let alone complex three-dimensional shapes as the cap 12 of the present invention illustrated in FIG. 8. Additionally, the clear film 82 shown on the outside surface of the LCF 74 is extremely thin and can be scratched by a foreign object, such as a key, fingernail, etc., thereby distorting the effects of the LCF 74 and exposing the core 76 to scratching or wear.

As FIGS. 19 and 20 illustrate, the button assembly –10*a* of the present invention can be utilized with a core –90 that does not include any protective layers, such as layers 82 and 84. As FIG. 20 illustrates, when utilized with a formed cap 12, the core 90 can be inserted directly within the interior space 22 of the cap 12 behind the ablated black layer 36 before molding, similar to the foils 48 and 46 of FIG. 12. Thereafter a translucent resin 24, which can be either clear or tinted to a desired color, can be injection molded as described above to provide an integrally formed finished button assembly 10*a* having light directing properties. Thus, the core 90 is subjected to thermoforming and molding temperatures and pressures and does not distort.

It is to be noted that when the core 90 is mounted within the interior space 22 of the cap 12, the core 90 like the graphic image 14 is not exposed to a user and thus is not susceptible to scratches and wear as is the LCF 74 of the prior art button 100. Additionally, as FIG. 20 illustrates, the core 90 can be bent to accommodate curved or three dimensional surfaces of the cap 12 still providing the desired light directing properties since the louvers 92 are slightly aligned with the curved surface 30 of the cap 12.

Alternatively, the core 90 can be utilized with one or both of the protective layers 82 and 84 and molded with a formed cap 12 as described above. Furthermore, the core 90, with or without the protective layers 82 and 84, can be molded to the exterior first surface 38 of the formed cap 12 and can be utilized with a flat transparent sheet 34 and coating 36 and then thermoformed into the cap 12 without detracting from the light control properties thereof.

In any event, the core 90 with or without the protective layers 82 and 84 can be utilized along curved surfaces, on the second surface 39 or interior surface 22 of a display or button and can withstand the temperatures and pressures of thermoforming and/or molding.

Daytime and nighttime colors can also be utilized with the core 90. Preferably, as FIG. 19 illustrates, the daytime color is provided with a color TSS foil 93, similar to the foils 48 and 46, positioned between the core 90 and the cap 12. The second nighttime color be provided on the opposite side of the core 90 with another color TSS foil, a tinted support member 16 or a clear support member 16 illuminated with a tinted bulb.

In order to reduce scattering of the light by the daytime color TSS foil after the light is directed by the core 90, the thickness of the daytime color TSS foil 93 is selected to be very thin. Preferably, the thickness must be sufficient to provide the desired daytime color yet prevent scattering when backlit. The preferred daytime colors for the TSS foils 93 in front of the core 90 are metallic gold and silver due to the metallic appearance and ease of providing the desired thin layers with these colors. Other colors, including non-metallic colors, are possible, however, so long as they provide the desired daytime color without scattering.

Preferably, the gold and silver metallic colors are provided by an extremely thin metallized film. As described above, the metal utilized to provide the color film can be either aluminum, silver, gold, copper, titanium, chromium, nickel or stainless steel, but can vary. Aluminum is preferably used due to its color and low cost.

The metal layer is provided on one side of a thin mylar polyester sheet by vapor deposition and is referred to as "vapor metallizing." When aluminum is utilized by itself, the daytime color is substantially metallic silver which takes on a metallic gun metal blue appearance with extremely thin layers. To provide other substantially metallic colors, a thin layer of colored varnish or the like, such as gold, is first provided on the mylar sheet with the aluminum deposited over it. When formed, the aluminum layer faces the core 90 with the colored varnish facing the cap 12 so as to provide the desired daytime color.

The thickness of the metallized layer is typically expressed in terms of angstroms, optical density and percentage of light transmission. Thicknesses below 30 angstroms are more easily measured by optical density and percentage of light transmission. With aluminum, a thickness of approximately 30 angstroms has a corresponding optical density of approximately 1.00 and light transmission of approximately 10%.

As the metallic layer becomes thinner, more light is transmitted through it. With thinner layers, however, the daytime color provided by the metallic layer is less visible. Thus, a balance between daytime color and light transmission must be achieved.

In actual testing with aluminum, layers have been achieved with optical densities of at least 0.004 having light transmission between 80–100%. Extremely thin layers, however, are difficult to accurately apply and measure. Good results have been achieved with layers having optical densities between 0.80 and 1.77 with corresponding light transmission of approximately 16% and 2% respectively.

These values, however, can be higher or lower so long as the desired daytime color and light transmission are provided. Thus, the invention is not to be limited to a specific thickness, material or color of the color layer or metallized foil.

Modifications and variations of the present invention are possible in light of the above teachings. It therefore is to be understood that within the scope of the appended claims, the invention may be practiced otherwise than as specifically described.

What is claimed and desired to be secured by letters patent is:

1. A button assembly comprising a graphic image which exhibits a first color, and when back-lit, provides said graphic image with a different color, comprising:

a transparent cap member having a predetermined shape, a first exterior surface side, and a second interior surface side;

means for defining a graphic image, within a layer of opaque material, upon said second interior surface side of said transparent cap member, comprising a layer of opaque material disposed upon said second interior surface side of said transparent cap member, and graphic image portions ablated away from said layer of opaque material in accordance with a predetermined graphic image pattern by a laser beam directed at portions of said first exterior surface side of said transparent cap member which correspond to said predetermined graphic image pattern such that said laser beam passes through said transparent cap member so as to contact and ablate portions of said layer of opaque material, and thereby define said graphic image which is visible through said transparent cap member and which corresponds to said predetermined graphic image pattern, without causing portions of said layer of opaque material to become embedded within said transparent cap member;

first translucent color means disposed upon said second interior surface side of said cap member so as to at least cover said graphic image;

second translucent color means disposed upon said second interior surface side of said cap member so as to at least cover said first translucent color means; and transparent support means connected to said cap member for providing support to said cap member and for cooperating with said second interior surface side of said cap member by covering said first and second translucent color means such that when said button assembly is viewed from said first exterior surface side of said cap member, said button assembly comprises a graphic image which exhibits a first color which corresponds to said first color means, and when back-lit from said second interior surface side of said cap member, said graphic image exhibits a second color which corresponds to said second color means.

2. The assembly as defined in claim 1 wherein said first and second color means are separate color foil means.

3. The assembly as defined in claim 1 wherein said first and second color means are contained on a single color foil means.

4. The assembly as defined in claim 1 wherein said formed cap member has a complex three-dimensional shape.

5. An assembly having a light-transmissive image thereon which, when back-lit, directs light transmitted through said image and emanating from a first front side of said assembly in a predetermined pattern, comprising:

a light-transmissive sheet member having a first front side and a second opposite rear side;

means for defining a light-transmissive graphic image, within a layer of opaque material, upon said second rear side of said light-transmissive sheet member, comprising a layer of opaque material disposed upon said second rear side of said light-transmissive sheet member, and graphic image portions ablated away from said layer of opaque material in accordance with a predetermined graphic image pattern by a laser beam directed at portions of said first front side of said light-transmissive sheet member which correspond to said predetermined graphic image pattern such that said laser beam passes through said light-transmissive sheet member so as to contact and ablate portions of said layer of opaque material, and thereby define said graphic image which is visible through said light-transmissive sheet member and which corresponds to said predetermined graphic image pattern, without causing portions of said layer of opaque material to become embedded within said light-transmissive sheet member; and light-directing film means disposed upon said second rear side of said light-transmissive sheet member and covering said graphic image disposed upon said second rear side of said light-transmissive sheet member for directing light, directed onto said light-directing film from a position behind said light-directing film, in a predetermined pattern through said light-directing film and toward said graphic image and said light-transmissive sheet member such that said light emanates from said first front side of said light-transmissive sheet member in a predetermined pattern.

6. The assembly as defined in claim 5 wherein said sheet member has a pre-formed shape.

7. The assembly as defined in claim 5 including a first daytime translucent color means covering said graphic image on said second side of said sheet member.

8. The assembly as defined in claim 5 wherein said first daytime translucent color means is a first foil member.

9. The assembly as defined in claim 7, wherein:

said first daytime translucent color means comprises one of the group of gold, aluminum, copper, titanium, chromium, nickel, stainless steel, and silver.

10. The assembly as defined in claim 8 wherein said foil member is a metallic foil of sufficient thickness to provide the desired daytime color yet prevent light scattering when backlit.

11. The assembly as defined in claim 7 including a second nighttime translucent color means covering said first color means, said second color means being visible from the first side of said sheet member when back-lit.

12. The assembly as defined in claim 11 wherein said second color means is a second foil member.

13. The assembly as defined in claim 11 wherein said second color means is a tinted support member connected to said second side of said sheet member.

14. The assembly as defined in claim 11 wherein said second color means comprises a clear support member connected to said second side of said sheet member and a tinted bulb for back lighting said assembly.

15. The assembly as defined in claim 14 including a first foil member positioned between said second side of said sheet member and said film means to provide a first daytime translucent color to said graphic image and a second foil member positioned on the opposite side of said film means to provide a second nighttime color to said graphic image.

16. A button assembly comprising a graphic image which exhibits a first color visible during daytime, and when back-lit, provides said graphic image with a different color visible during nighttime, comprising:

a light-transmissive cap member having a predetermined shape, a first exterior surface side, and a second interior surface side;

means defining a graphic image, within a layer of opaque material, upon said second interior surface side of said light-transmissive cap member, comprising a layer of opaque material disposed upon said second interior surface side of said light-transmissive cap member, and graphic image portions ablated away from said layer of opaque material in accordance with a predetermined light-transmissive graphic image pattern by a laser beam directed at portions of said first exterior surface side of said light-transmissive cap member which correspond to said predetermined graphic image pattern such that said laser beam passes through said light-transmissive cap member so as to contact and ablate portions of said layer of opaque material, and thereby define said graphic image which is visible through said light-transmissive cap member and which corresponds to said predetermined graphic image pattern, without causing portions of said layer of opaque material to become embedded within said light-transmissive cap member;

first light-transmissive color means disposed upon said second interior surface side of said light-transmissive cap member so as to at least cover said graphic image thereon and provide said graphic image with a first color visible during daytime; and second light-transmissive color means disposed upon said second interior surface side of said light-transmissive cap member so as to at least cover said first color means and provide said graphic image with a second color visible during nighttime when said second light-transmissive color means is back-lit with light which passes through said second light-transmissive color means, said first light-transmissive color means, said graphic image disposed upon said light-transmissive cap member, and said light-transmissive cap member so as to be visible from said first exterior surface side of said light-transmissive cap member.

17. An assembly as set forth in claim 16, wherein:

said cap member is transparent, said first color means comprises a first translucent foil member, and said second color means comprises a second translucent foil member.

18. An assembly as set forth in claim 16, wherein:

said cap member is transparent; said first color means comprises a first translucent foil member; and said second color means comprises a tinted support means connected to said second interior surface side of said cap member and a bulb for illuminating said tinted support means in a back-lit mode.

19. An assembly as set forth in claim 16, wherein:

said cap member is transparent; said first color means comprises a first translucent foil member; and said second color means comprises a light-transmissive support means connected to said second interior surface side of said cap member and a tinted bulb for illuminating said light-transmissive support means in a back-lit more.

20. An assembly as set forth in claim 16, wherein:

said light-transmissive cap member is transparent;

said first color means comprises a tinted support means connected to said second interior surface side of said cap member; and said second color means comprises a tinted bulb for illuminating said tinted support means in a back-lit mode.

* * * * *